United States Patent [19]

Peterson

[11] Patent Number: 4,591,413
[45] Date of Patent: May 27, 1986

[54] MULTISTAGE FLASH EVAPORATOR PROVIDING ISOLATION OF IMPURE STAGE DISTILLATE FLOWS FROM THE MAIN DUCT DISTILLATE FLOW

[75] Inventor: Ray D. Peterson, Upper Providence Township, Delaware County, Pa.

[73] Assignee: Westinghouse Electric Corp., Pittsburgh, Pa.

[21] Appl. No.: 743,712

[22] Filed: Jun. 11, 1985

[51] Int. Cl.$^4$ ............................................. B01D 3/06
[52] U.S. Cl. ..................................... 202/173; 202/202; 159/2.3; 159/44; 203/3; 203/11; 203/88
[58] Field of Search ............... 202/173, 162, 202, 174, 202/180; 203/1, 11, 88, 73, 80, DIG. 173; 159/2.3, 43.1, 44, 17.4, DIG. 8

[56] References Cited

U.S. PATENT DOCUMENTS

| | | | |
|---|---|---|---|
| 3,461,460 | 8/1969 | McGrath | 202/173 |
| 3,505,173 | 4/1970 | Randell | 203/3 |
| 3,527,676 | 9/1970 | Hingst et al. | 203/3 |
| 3,533,917 | 10/1970 | Williams | 202/173 |
| 3,713,989 | 1/1973 | Bom | 202/173 |
| 4,312,710 | 1/1982 | Tanaka et al. | 202/173 |
| 4,334,961 | 6/1982 | Moen et al. | 203/88 |

Primary Examiner—Wilbur Bascomb
Attorney, Agent, or Firm—E. F. Possessky

[57] ABSTRACT

A conventional cross-flow or paired-stage multi-stage flash evaporator plant is provided with duct means for collecting distillate from collection trays in the successive evaporator units in the plant. Distillate from individual units is diverted to a bypass flow path from the duct means when it is detected to be contaminated with brine.

9 Claims, 4 Drawing Figures

MULTISTAGE FLASH EVAPORATOR PROVIDING ISOLATION OF IMPURE STAGE DISTILLATE FLOWS FROM THE MAIN DUCT DISTILLATE FLOW

BACKGROUND OF THE INVENTION

The present invention relates to multistage flash evaporators and more particularly to distillate collection in flash evaporators of the cross-flow and paired-stage types.

In a conventional multistage flash (MSF) evaporator, heated brine is passed through a series of stages, from the highest to the lowest temperature stage, with a portion of the brine flashing into vapor in each stage. The vapor formed is then passed through a mesh separator and condensed on tubes in the same stage. In a paired-stage or cross-flow type MSF evaporator, the distillate formed in each stage is normally collected in a distillate tray and drained into a duct located at one end of the condenser tube bundle. The duct passes under each stage's distillate tray, cascading stage-to-stage until the total accumulated flow is removed from the lowest temperature stage by the distillate pump.

This invention provides a simple method for isolating and rejecting unacceptable distillate produced in individual stages of an MSF evaporator. This allows production to continue (at some reduction in output) until an outage can be scheduled to correct the problem. Without this invention, the alternative is to immediately shut down the unit whenever a purity problem occurs, with loss of all distillate production until the problem can be corrected. In many instances, this alternative is completely unacceptable.

In operation of multistage flash evaporators, the development of unacceptable contaminated distillate from one or more stages typically requires shutdown of the entire unit until the impurity problem is corrected. Contamination can result for example from a tube leak or from brine carryover caused by a displaced mesh. Shutdown of the entire distillation process for a localized impurity problem may be virtually unacceptable because of existing demand for water production, or at the very least it interferes with economic plant maintenance management based on a scheduling of plant shutdowns.

It has thus been desirable to develop a reliable and preferably simple scheme for blocking the collection of distillate flow from any individual stage in which the flow is determined to be impure (i.e., contains brine). In this manner, repair of the impure stage(s) can be economically deferred until a plant maintenance shutdown is scheduled.

Some effort has been applied in the prior art to address the stage distillate impurity problem. For example, in U.S. Pat. No. 3,713,989 by P. R. Bom, a scheme is shown for isolating stage distillate flows. The scheme is structurally involved, requires a relatively large space under each tube bundle and is directed to long flow plants.

SUMMARY OF THE INVENTION

A flash evaporator unit for a multistage flash evaporation plant wherein successive evaporation stages are operated at successively decreasing temperatures and pressures to evaporate water from a brine solution, said evaporator unit comprising: an elongated enclosure having opposed end walls; a tube bundle extending between said end walls to provide at least one upper condenser chamber to which vapor is directed from a lower evaporation chamber through which brine flows in the cross-direction; means including a tray for collecting distillate from said tube bundle; duct means extending in the cross-direction through successive evaporator units in said plant and disposed to collect distillate from said tray means; means for holding the tray distillate in a space isolated from said duct means prior to its entry into said duct means; means for detecting the conduction of the duct distillate outflow from said evaporator unit; and means for bypassing distillate from said holding space to an evaporation chamber in the same or a subsequent stage so that contaminated distillate can be withheld from the accumulating distillate flow in said duct means when said detecting means indicates said evaporator unit is producing contaminated distillate.

DESCRIPTION OF THE PREFERRED EMBODIMENT

Figure 1:
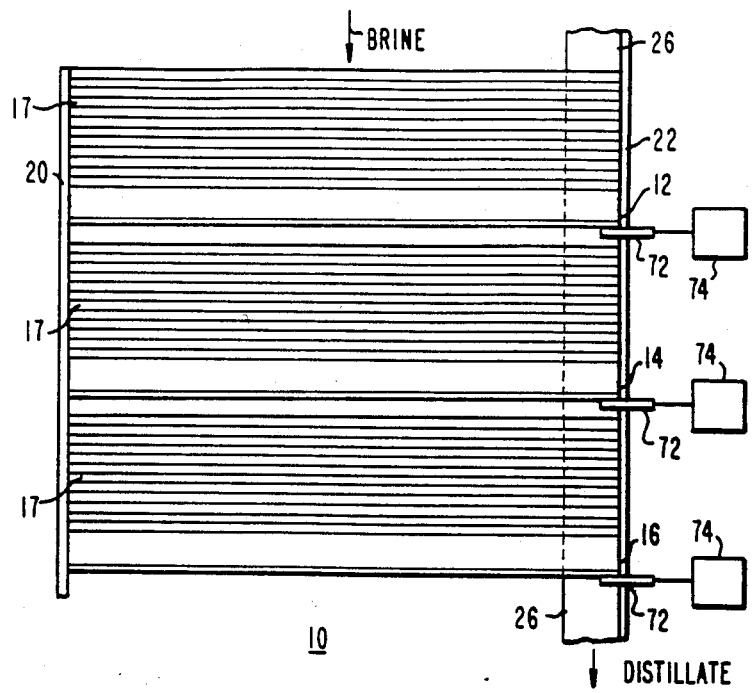
FIG. 1 shows a schematic diagram of a portion of a multistage cross-flow evaporator plant in which distillate flows are collected in accordance with the invention.

More particularly, there is shown in FIG. 1 a cross-flow type multistage evaporator 10 which includes a series of evaporator units with three of such units 12, 14 and 16 being shown. Basically, a single evaporation stage is provided in each evaporator unit in the cross-flow plant. A tube bundle 17 extends between sidewalls 20, 22 of each evaporator unit and heated brine flows under and across the bundles from unit to unit or stage to stage as illustrated. A portion of the brine flashes into vapor in each stage.

Successive evaporator stages operate at progressively lower pressures and temperatures. Flash vapors in each stage rise through a mesh structure (not shown) to the tube bundle 17 where condensation occurs. Distillate droplets fall to a collection tray (not shown in FIG. 1) which is provided over the brine and under the tube bundle 17 along the entire bundle length. A main distillate collection duct 26 extends along the plant and across the successive evaporator stages on one side of the tube bundles 17. The individual stage collection trays are interconnected to the main collection duct 26 to provide a cascaded distillate flow along the length of the main duct 26. The total flow is removed by the main duct 26. The total flow is removed from the lowest temperature stage by a distillate pump (not shown).

Figure 2:
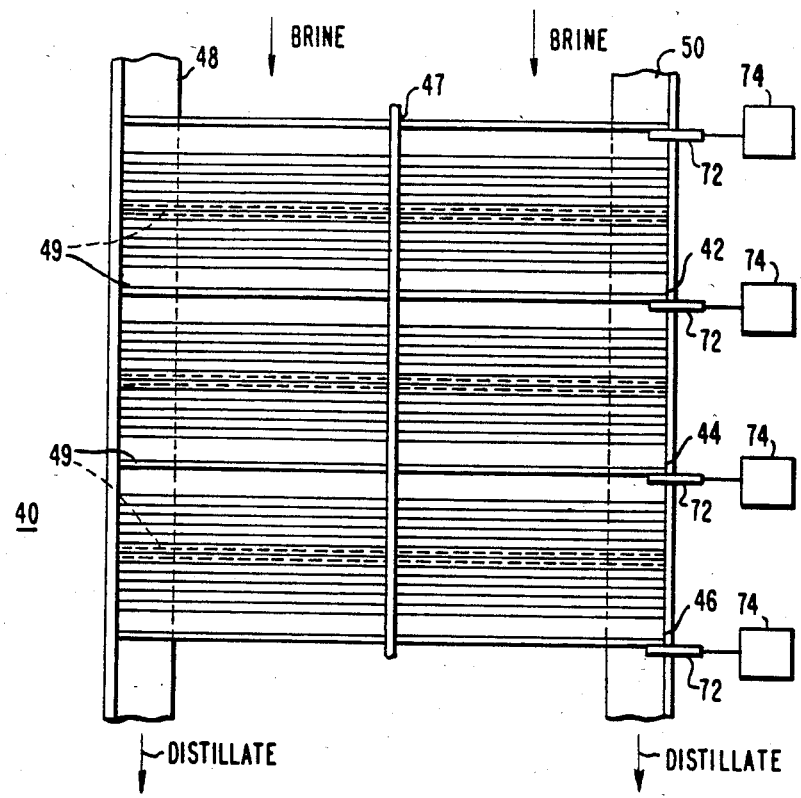
FIG. 2 shows a schematic diagram of a portion of a paired-stage type multistage evaporator plant in which distillate flows are collected in accordance with the invention.

As shown in FIG. 2, a paired-stage type multi-stage evaporator plant 40 includes individual evaporator units of which three are shown as indicated by the reference characters 42, 44 and 46. A tube bundle also extends from sidewall to sidewall in each paired-stage evaporator unit, but a partition structure 47 is provided with each unit to divide the space so that two evaporation stages are provided by each unit.

Again, the brine is cascaded from unit to unit and from stage to stage within each unit in a cross-flow pattern relative to the tube bundles.

The tube bundles are partitioned so that half of the tube lengths are located in the right half of the unit in one evaporation stage and the other half of the tube lengths are located in the left half of the unit in a second evaporation stage. A partitioned distillate collection tray 47 is provided under each tube bundle similarly to the case of the cross-flow design.

In this case, a main distillate collection duct 48 or 50 is provided along each side of the plant respectively connected to the tray portions associated with individual left-hand stages and the individual tray portions associated with the right-hand stages.

Figure 4:
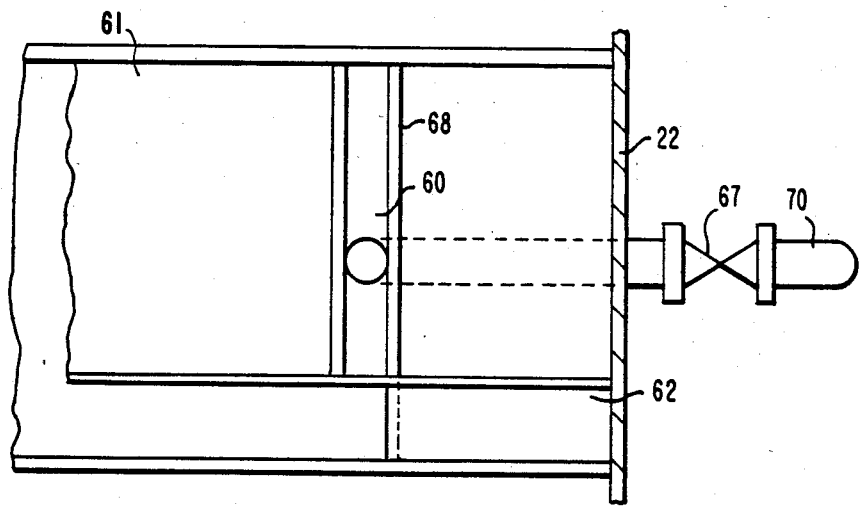
FIG. 4 shows a portion of the evaporator unit which provides a top view of the distillate isolation duct structure shown in FIG. 3.
Figure 3:
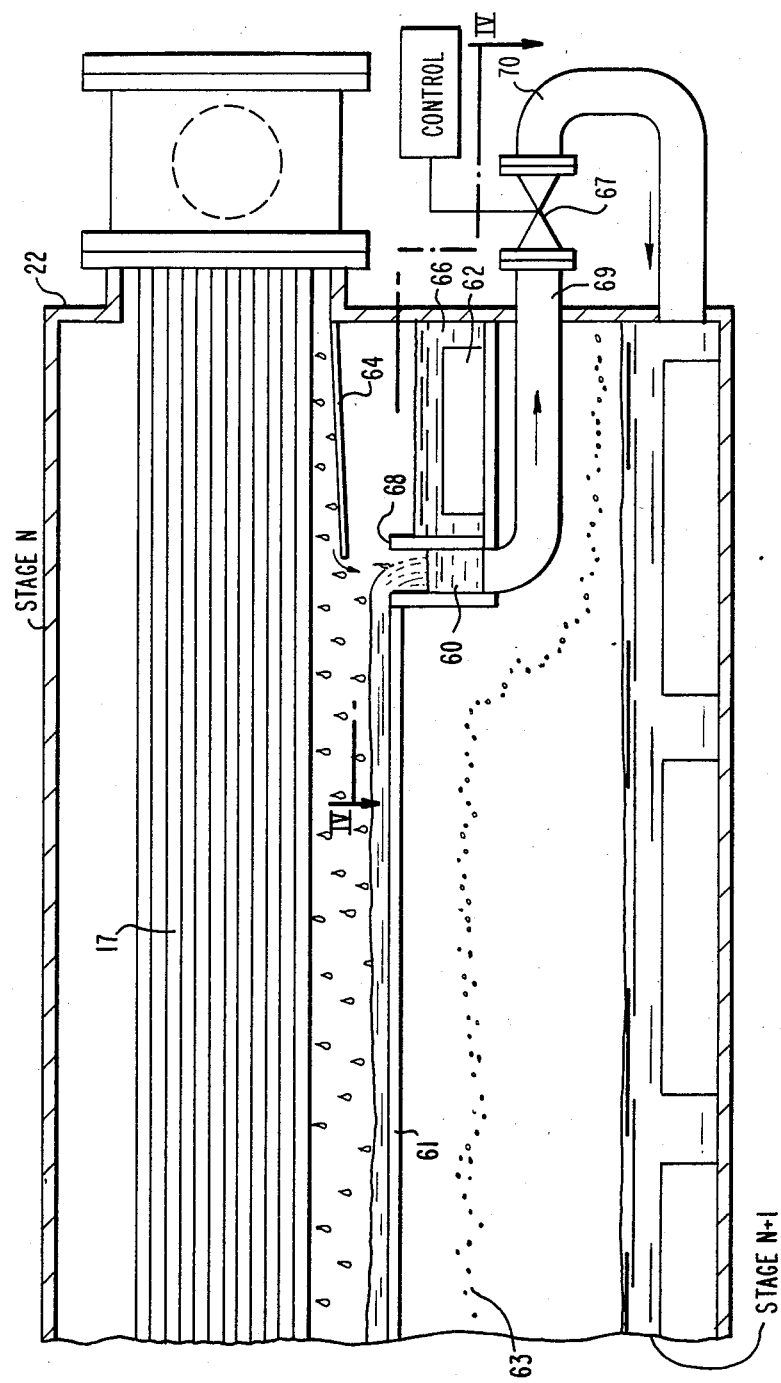
FIG. 3 is a partial view of an evaporator unit in which the distillate duct collection system is shown in section to illustrate the distillate isolation structure provided in accordance with the invention.

In FIGS. 3 and 4 there is shown structure that is used to isolate individual stage distillate flow in both the cross-flow and paired-stage types of multistage evaporator units. The illustrated unit is a cross-flow unit having en elongated enclosure in which vapor from a single evaporation stage 63 is condensed on tubes in a tube bundle 17 in a single condenser stage. In a paired-stage unit, the upper portion of the enclosure is cross-partitioned (see 47 in FIG. 2) to provide two longitudinally extending condenser chambers in end-to-end relation. The lower portions of the enclosure are longitudinally partitioned (see 49 in FIG. 2) to provide two side-by-side evaporation chambers which extend the full length of the enclosure. The evaporation chambers are respectively associated with the condenser chambers to provide a paired-stage unit. U.S. Pat. No. 4,334,961 is hereby incorporated by reference for further structural detail.

In the improvement structure to which this invention is directed, an isolated stage distillate collection space 60 is defined by a partition, wall or dam 68, in this case within a main duct 62 (corresponding to 26 in FIG. 1 or 48 or 50 in FIG. 2).

An umbrella baffle 64 directs distillate droplets falling from the tubes above to stage tray 61 or the isolation reservoir 60 and blocks them from directly entering the main duct chamber 66 through which the cascading distillate flows from the next upstream stage to the next downstream stage. The umbrella baffle also permits vapor released from the cascading distillate in each stage to escape around the baffle (on 2 or 3 sides), to be condensed on the tubes in that stage.

If the distillate collected behind the dam 68 from the tray 61 is sufficiently pure, it is permitted to overflow the dam 68 into the cascaded main flow in the main duct chamber 66.

If it is determined that the distillate collected in the stage shown in FIGS. 3 and 4 is contaminated with brine, a normally closed distillate dump valve 67 is opened to bypass distillate from the isolation reservoir 60 through piping to the flashing brine stream. The dump valve 67 is located outside the evaporator unit for accessibility and is interconnected between the pipes 69 and 70. The bypass can be made to the brine stream in the same stage but preferably it is made to the brine stream in the next or a subsequent downstream stage to provide additional pressure differential to overcome the pressure drop through the dump valve and piping.

As shown in FIGS. 1 and 2, a conventional conductivity electrode probe 72 is disposed in the distillate duct 26 at each stage to indicate externally on a meter 74 the purity of the distillate at that stage. If the operator observes an evaporator unit where impure distillate is being introduced, the dump valve 67 for that unit may be opened to bypass that unit's distillate from the main distillate flow until the plant is shut down so that repairs can be made.

What is claimed is:

1. A flash evaporator unit for a multistage flash evaporation plant wherein successive evaporation stages are operated at successively decreasing temperatures and pressures to evaporate water from a brine solution, said evaporator unit comprising:

an elongated enclosure having opposed end walls;
a tube bundle extending between said end walls to provide at least one upper condenser chamber to which vapor is directed from a lower evaporation chamber through which brine flows in the cross-direction;
means including a tray for collecting distillate from said tube bundle;
duct means extending in the cross-direction through successive evaporator units in said plant and disposed to collect distillate from said tray means;
means for holding the tray distillate in a space isolated from said duct means prior to its entry into said duct means;
means for detecting the conduction of the duct distillate outflow from said evaporator unit; and
means for bypassing distillate from said holding space to an evaporation chamber in the same or a subsequent stage so that contaminated distillate can be withheld from the accumulating distillate flow in said duct means when said detecting means indicates said evaporator unit is producing contaminated distillate.

2. A flash evaporator unit as set forth in claim 1 wherein baffle means are provided under said tube bundle and over said duct means to prevent direct distillate drip into said duct means and to direct collected distillate to said tray.

3. A flash evaporator unit as set forth in claim 1 wherein said unit is a conventional cross-flow unit and said duct mean comprises a duct extending in the cross-direction near one end of said enclosure.

4. A flash evaporator unit as set forth in claim 1 wherein said unit is a paired-stage cross-flow unit, said distillate collecting means includes separate collecting means from each condenser stage, and said duct means comprises respective ducts extending in the cross-direction located near the opposite ends of said enclosure and respectively supplied with distillate from said separate collecting means.

5. A flash evaporator unit as set forth in claim 1 wherein said holding means comprises wall means forming a dam in the flow path between said tray and said duct means so that tray distillate overflows to said duct means unless it is bypassed therefrom.

6. A flash evaporator unit as set forth in claim 5 wherein pipe means are provided for bypassing distillate from said holding means to the flash chamber of the same or a subsequent stage, and controllable valve means are provided for releasing distillate to flow from said holding means through the bypass path.

7. A flash evaporator unit as set forth in claim 4 wherein said baffle means are provided under said tube bundle and over each of said duct means to prevent direct distillate drip into each of said duct means and to direct collected distillate to the associated tray.

8. A flash evaporator unit as set forth in claim 4 wherein said holding means comprises wall means forming a dam in the flow path between said tray and each of said duct means so that tray distillate overflows to each of said duct means unless it is bypassed therefrom.

9. A flash evaporator unit as set forth in claim 4 wherein pipe means are provided for bypassing distillate from said holding means to the flash chamber of the same or a subsequent stage, and controllable valve means are provided for releasing distillate to flow from said holding means through the bypass path.

* * * * *